Nov. 25, 1969  F. L. CROW  3,479,990
CAT TREE
Filed Jan. 11, 1968
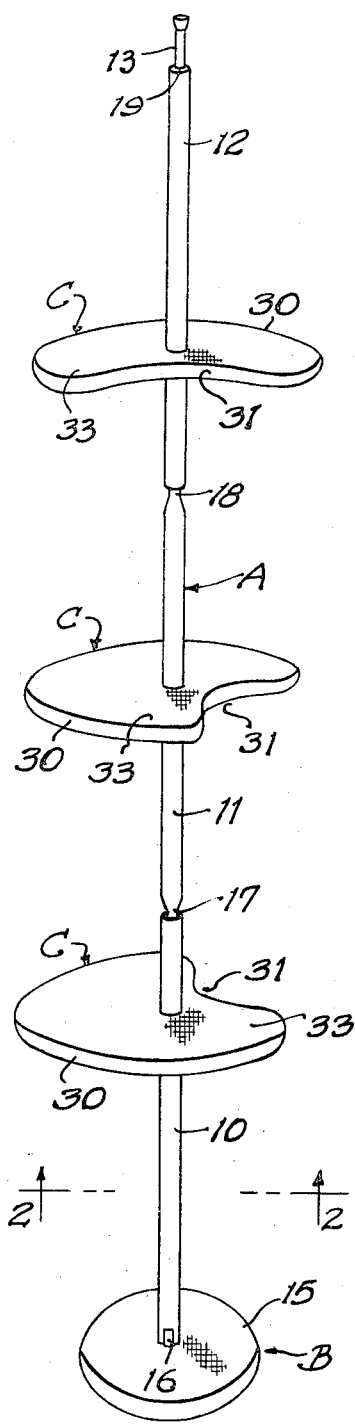
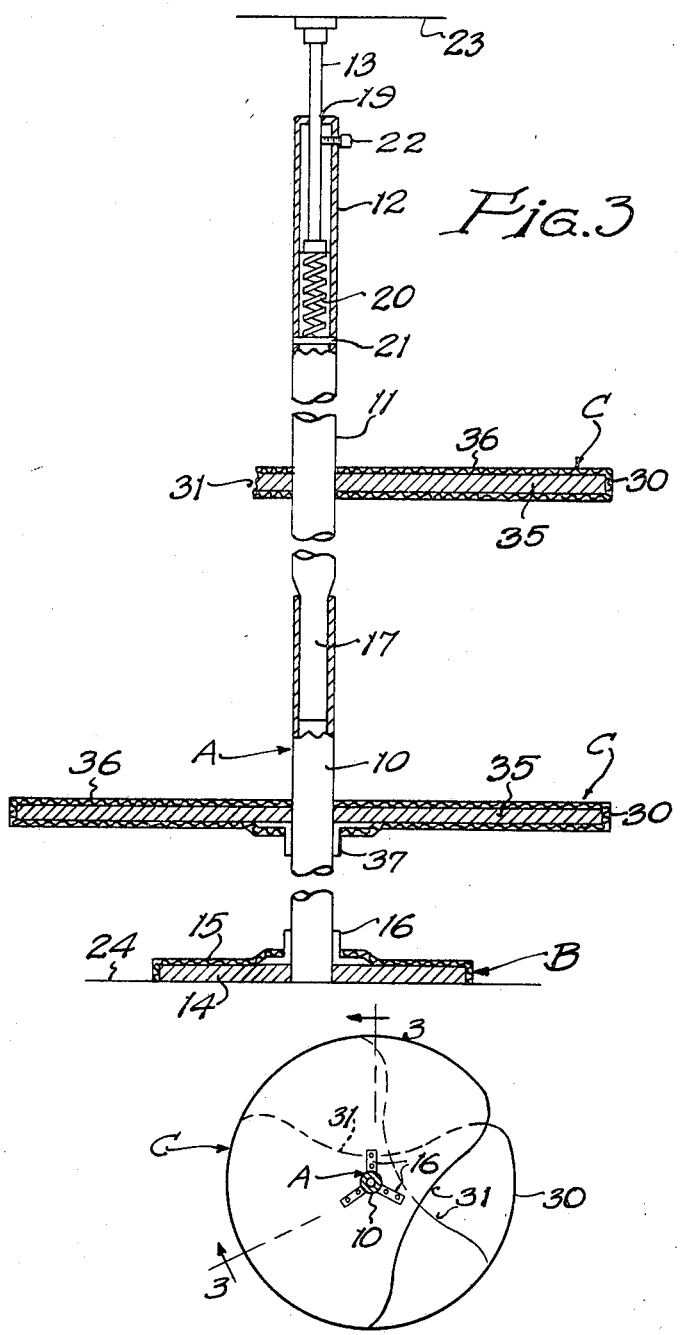
INVENTOR.
FRANK L. CROW
BY
Lynn H. Latta
—ATTORNEY—

United States Patent Office 3,479,990
Patented Nov. 25, 1969

3,479,990
CAT TREE
Frank L. Crow, 2054 Argyle St., Apt. 104,
Los Angeles, Calif. 90028
Filed Jan. 11, 1968, Ser. No. 697,068
Int. Cl. A01k 1/00; A63b 9/00
U.S. Cl. 119—1                                    5 Claims

ABSTRACT OF THE DISCLOSURE

Disclosed herein is a cat tree embodying a plurality of cat landing stations or platforms carried by a sectional pole adapted to be mounted in a vertical position in a selected room of a dwelling, with a base engaged against the floor to hold the tree against rotation, with a spring-loaded plunger engaged against the ceiling, and with the platforms covered with a tough textile material which provides a scratching, claw-sharpening surface.

OBJECTS OF INVENTION

The invention provides an answer to problems that are commonly faced by cat owners who esteem their pets to the point of housing them within their own dwellings in contrast to keeping them on the outside. Principally, such problems include (1) damaging of upholstery by claw-sharpening scratching, and (2) climbing of draperies, etc. With these problems in mind, the invention has, among its objects, to provide a cat tree:

(1) Which will be an attractive decorative accessory and can be color-coordinated with room decorations;

(2) Which will provide a clawing surface of maximum appeal to a cat;

(3) Which will provide a climbing structure of high appeal and good exercising facility, satisfying a cat's needs for climbing and sitting on an elevated perch;

(4) Which will consequently protect upholstered furniture and carpeting from claw damage;

(5) In which the upholstered surfaces facilitate climbing activities;

(6) In which a stairstep arrangement of platforms facilitates movements from one platform to another;

(7) In which platforms can be adjusted as to height and vertical spacing between them, depending upon the size and age of a cat using the tree.

(8) Which will provide a facility for playing, feeding and sleeping as well as clawing;

(9) Which will provide a support to which hanging toys can be easily attached;

(10) Which is sectional and readily assembled and taken apart for shipping, storing, etc.;

(11) Which requires no nails, screws or the like for its installation;

(12) Which occupies only a 20-inch diameter, circular area of floor space;

(13) On which the platform coverings can be readily replaced;

(14) Which is useful for alternative functions such as supporting ash trays, bookends, books, figurines, etc.

SUMMARY OF INVENTION

The invention is characterized in that the cat landing stations or platforms are of crescent shape or equivalent non-circular configuration and are arranged in angularly displaced, stepped succession such as to facilitate ascent and descent from one platform to a succeeding platform, a preferred shape being a crescent shape developed by scalloped cut-away of one side of a circular platform, so as to attain a maximum aesthetic effect in the assembly.

DESCRIPTION

In the drawings:

FIG. 1 is a perspective view of a cat tree embodying the invention;

FIG. 2 is an inverted plan view, with the support pole shown in cross section on the line 2—2 of FIG. 1; and FIG. 3 is a fragmentary vertical sectional view taken on line 3—3 of FIG. 2.

In general the cat tree of my invention comprises a sectional support pole A, a base B and a plurality (e.g. 3) of cat landing stations or platforms C carried by the respective sections of pole A.

Pole A comprises sections 10, 11 and 12 of metal tubing, and a plunger 13 mounted in the upper section. Section 10 is mounted in base B consisting of a circular disc 14 of wood or equivalent material and a covering 15 of looped-pile carpeting or heavy furniture upholstering woven fabric or equivalent fabric offering sufficient resistance to a cat's claws to provide a clawing surface of good appeal to a cat. Three or more brackets 16 of ribbon metal and of L-shape are secured to base disc 14 and to pole 10 in equal circumferential spacing, in order to secure the base to the pole with adequate bracing.

Pole section 11 has reduced end portions 17, 18 which are telescoped into pole sections 10 and 12 in order to secure the three pole sections together. Plunger 13 is slidably mounted in a guide aperture 19 (e.g. in a cap) in the upper end of upper section 11, and is spring-loaded by a coil spring 20 engaged under compression between the lower end of the plunger and a suitable abutment 21 (e.g. pin) in pole section 11. A set screw 22 may be employed to lock the pin 13 to pole section 11 in whatever position the plunger assumes when spring-pressed against a room ceiling 23 when the base B is seated against a floor 24 and the pole A is vertical.

Platforms C may be of identical configuration, with a circular or approximately circular periphery 30, each having one side cut out to provide a recess 31 providing a space through which a cat may jump from one platform to another with much greater facility than if each platform were fully covered by the next higher platform. The recess of each of the platforms above the lowest, is angularly offset with reference to the recess of the next lower platform, so that each of the lower platforms has a launching area 33 projecting beneath the recess 31 of the next higher platform, and a cat may spring from such launching area onto a horizontally displaced banding area 33 (the same as the launching area) on the next platform, with a forward motion which facilitates obtaining a footing on the landing area. In the arrangement shown, the landing areas are angularly displaced in a common direction from the launching areas, and provide a stairstep arrangement facilitating the most rapid and easy ascent and descent.

The platforms C are each constructed of a scalloped disc 35 of wood or equivalent available material, and a covering 36 of fabric equivalent to that of base B, providing a clawing surface, the covering being secured to the disc 35 as by tacks or sewing, so as to cover all surfaces thereof (top, periphery and bottom). Discs 35 are secured to respective sections of pole A by L-brackets 37 of strap metal, partially covered by coverings 36. Preferably the brackets 37 are arranged in groups of three for each platform, one normal to the adjacent cutout margin 31 and the other two substantially bisecting the two half-segments of the full-diameter area of the respective platform so as to provide maximum support therefor.

For maximum aesthetic appeal, the cat landing stations or platforms C are circular except for their cutout recesses 31, and are arranged with their circular peripheries 30 coaxial with pole A. The desired stepped arrangement of their launching-landing surfaces is then easily obtained by displacing each platform angularly about the pole, with equal displacements between the several platforms.

The base B engages floor surface 24 under the reaction load of spring 20, and functions to hold the tree against rotation under the impetus imparted by the springing of a cat from one platform to another or to the floor.

The tree may be disassembled completely and will thus occupy a suitably small space for shipping.

I claim:

1. In a cat tree:
    a pole having at its upper end a means for engagement against a room ceiling;
    a base in which the lower end of said pole is mounted, said base being engageable against a floor surface;
    and a plurality of horizontal platforms secured to and pierced by said pole;
    each platform comprising a body of rigid material; and a covering of clawable fabric upon each body;
    said platforms being arranged with portions thereof eccentric to the axis of said pole;
    each of said platforms being positioned in a different angularly-displaced, stepped vertical arrangement providing cat landing stations facilitating leaping by a cat from one platform to another.

2. A cat tree as defined in claim 1, wherein said platforms are of crescent shape, each having a cutaway recess in one side thereof.

3. A cat tree as defined in claim 1, wherein said ceiling-engaging means comprises a spring-loaded plunger slidably telescoped in the upper end of said pole and engageable with spring pressure against a ceiling surface.

4. A cat tree as defined in claim 1, wherein said base is yieldingly engageable against a floor surface under pressure developed as the reaction load of said spring-loading means, whereby to inhibit rotation of said tree under the impetus of a cat's leaping from one platform to another or to the floor.

5. A cat tree as defined in claim 1, wherein said pole is composed of a plurality of sections having means for telescopically attaching them to one another in axial alignment, each platform being attached to a respective section.

References Cited

UNITED STATES PATENTS

| | | | |
|---|---|---|---|
| D. 195,412 | 6/1963 | Vernik | D33—3 |
| 2,887,988 | 5/1959 | Cottongim | 119—51 |
| 2,894,487 | 7/1959 | Goldson | 119—1 |
| 2,970,701 | 2/1961 | Fetter | 211—78 |
| 2,991,040 | 7/1961 | Levy | 248—356 |
| 3,327,310 | 6/1967 | Bethune et al. | 248—351 X |
| 3,437,060 | 4/1969 | Giambalvo | 108—151 |

OTHER REFERENCES

1965 Sears Fall & Winter Catalogue, page 1523.

ALDRICH F. MEDBERY, Primary Examiner

U.S. Cl. X.R.

D30—42; D33—3; D80—9; 108—151; 119—29; 248—356